(12) United States Patent
Izadian (10) Patent No.: US 10,923,829 B2
(45) Date of Patent: *Feb. 16, 2021

(54) VEHICLE-MOUNTED RADAR DEFLECTORS (71) Applicant: Waymo LLC, Mountain View, CA (US)

(72) Inventor: Jamal Izadian, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,214

(22) Filed: Jun. 6, 2019

(65) Prior Publication Data
US 2019/0288400 A1 Sep. 19, 2019

Related U.S. Application Data (63) Continuation of application No. 15/270,799, filed on Sep. 20, 2016, now Pat. No. 10,355,365.

(51) Int. Cl.
| | |
|---|---|
| G01S 13/52 | (2006.01) |
| H01Q 15/14 | (2006.01) |
| G01S 13/931 | (2020.01) |
| G01S 13/42 | (2006.01) |
| H01Q 1/32 | (2006.01) |
| H01Q 3/24 | (2006.01) |
| H01Q 19/10 | (2006.01) |
| G01S 17/931 | (2020.01) |

(52) U.S. Cl.
CPC ......... *H01Q 15/148* (2013.01); *G01S 13/426* (2013.01); *G01S 13/931* (2013.01); *G01S 17/931* (2020.01); *H01Q 1/3233* (2013.01); *H01Q 3/245* (2013.01); *H01Q 19/10* (2013.01); *G01S 2013/9329* (2020.01); *G01S 2013/93273* (2020.01)

(58) Field of Classification Search
CPC .... G01S 13/426; G01S 13/931; G01S 17/931; G01S 2013/93273; G01S 2013/9329; H01Q 15/148; H01Q 19/10; H01Q 1/3233; H01Q 3/245
See application file for complete search history.

(56) References Cited

U.S. PATENT DOCUMENTS

| | | | | |
|---|---|---|---|---|
| 10,355,365 | B2 * | 7/2019 | Izadian | H01Q 15/148 |
| 2004/0114205 | A1 * | 6/2004 | Richman | G02B 13/06 |
| | | | | 359/203.1 |
| 2007/0096885 | A1 * | 5/2007 | Cheng | B60W 40/04 |
| | | | | 340/435 |

(Continued)

Primary Examiner — Timothy A Brainard
(74) Attorney, Agent, or Firm — McDonnell Boehnen Hulbert & Berghoff LLP (57) ABSTRACT The present disclosure provides methods and apparatuses that enable a radar system to transmit radar signals into lanes on a roadway in which a vehicle may turn. For example, when a car is making a protected right turn, that is a right turn when there is another vehicle traveling in the same direction in a lane adjacent to the lane of the turning vehicle, a traditional radar may have its view of the lane in which it is turning obscured by the vehicle in the lane adjacent to the lane of the turning vehicle. By using radar deflectors strategically located near the front of the vehicle, the radar signals may be deflected at angles to avoid being obstructed by the vehicle in the lane adjacent to the lane of the turning vehicle.

20 Claims, 8 Drawing Sheets (56) References Cited

U.S. PATENT DOCUMENTS

2012/0296567 A1* 11/2012 Breed .................... G01C 21/26
701/468
2017/0293020 A1* 10/2017 Song .................... G01S 7/4814

* cited by examiner

Top View
Fig. 4

VEHICLE-MOUNTED RADAR DEFLECTORS

CROSS-REFERENCE TO RELATED APPLICATION

The present application claims priority to and is a continuation of U.S. patent application Ser. No. 15/270,799, filed on Sep. 20, 2016, the entire contents of which are herein incorporated by reference.

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located onboard and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

The present disclosure provides methods and apparatuses that enable a radar system to transmit radar signals into lanes on a roadway in which a vehicle may turn. A turn may be into or out of a protected (i.e. having a vehicle in the adject lane) or or unprotected (i.e. not having a vehicle in the adject lane) right or left turn. The turn may be made at an intersection where cross traffic may flow. For example, when a car is making a protected right turn, that is a right turn when there is another vehicle traveling in the same direction in a lane adjacent to the lane of the turning vehicle, a traditional radar may have its view of the lane in which it is turning obscured by the vehicle in the lane adjacent to the lane of the turning vehicle. By using radar deflectors strategically located near the front of the vehicle, the radar signals may be deflected at angles to avoid the radar signal being obstructed by the vehicle in the lane adjacent to the lane of the turning vehicle.

A method disclosed herein includes transmitting electromagnetic energy in a first direction by a radar located on a top portion of a vehicle. Additionally, the method includes deflecting a portion of the transmitted electromagnetic energy in a second direction with a second beamwidth by a deflector mounted to the vehicle. The first beamwidth and the second beamwidth are non-overlapping.

A vehicle system disclosed herein includes both a radar transmission unit and a radar deflector unit. The radar transmission unit is located on a top portion of a vehicle configured to transmit a radar signal. The radar deflector unit is mounted on the vehicle near a front of the vehicle. The radar deflector unit is configured to deflect a portion of the radar signal over a second beamwidth, where the first beamwidth and second beamwidth are non-overlapping.

A method disclosed herein includes transmitting electromagnetic energy by a radar located on a top portion of a vehicle. The electromagnetic energy is transmitted at least in part in the direction of a deflector mounted proximate to a passenger side of the vehicle. The method also includes deflecting a portion of the transmitted electromagnetic energy with a second beamwidth in a second direction aligned with a driver's side of the vehicle by a deflector mounted to the vehicle. The first and second beamwidths are non-overlapping.

The foregoing summary is illustrative only and is not intended to be in any way limiting. In addition to the illustrative aspects, embodiments, and objects described above, further aspects, embodiments, and objects will become apparent by reference to the figures and the following detailed description and the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

One aspect of the present disclosure provides an apparatus for extending the capabilities of the radar sensor units on a vehicle. For vehicular radar, in some instances, it may be desirable to have a 360-degree Field of View (FOV). Additionally, it may also be desirable to have the radar unit mounted on the top of the vehicle. By having data from 360 degrees, the vehicle may more accurately sense objects near the vehicle to aid in safe driving and navigation. However, in some instances, having a full 360-degree FOV may not provide enough information to determine if a vehicular maneuver is safe. For example, when a vehicle is making a right turn, if there is another vehicle in the lane to its left, the radar unit may not be able to interrogate the lane in which it intends to turn as the other vehicle is blocking the radar's view.

In order to mitigate this issue, a vehicle may include radar bending units (e.g. radar deflecting units) that operate based on reflecting and/or refracting the radar signals in order to allow the radar signal to propagate around a vehicle in the adjacent lane. In one example, the radar unit of the vehicle may be mounted on the top of the vehicle, the radar bending units may be located near the front of the vehicle, such as near or on top of the location of the headlights. These radar bending unit may be able to reflect and/or refract the radar signals at angles that could not be possible from the radar unit itself. Therefore, the radar bending units enable the radar unit to "see" areas which it could not without the use of the radar bending units. Furthermore, these deflecting/bending radar units may provide mechanical and/or electronic means of scanning the deflected beam similar to a way a human turns head to look a the incoming cross traffic for a right turn, for example.

Figure 1:
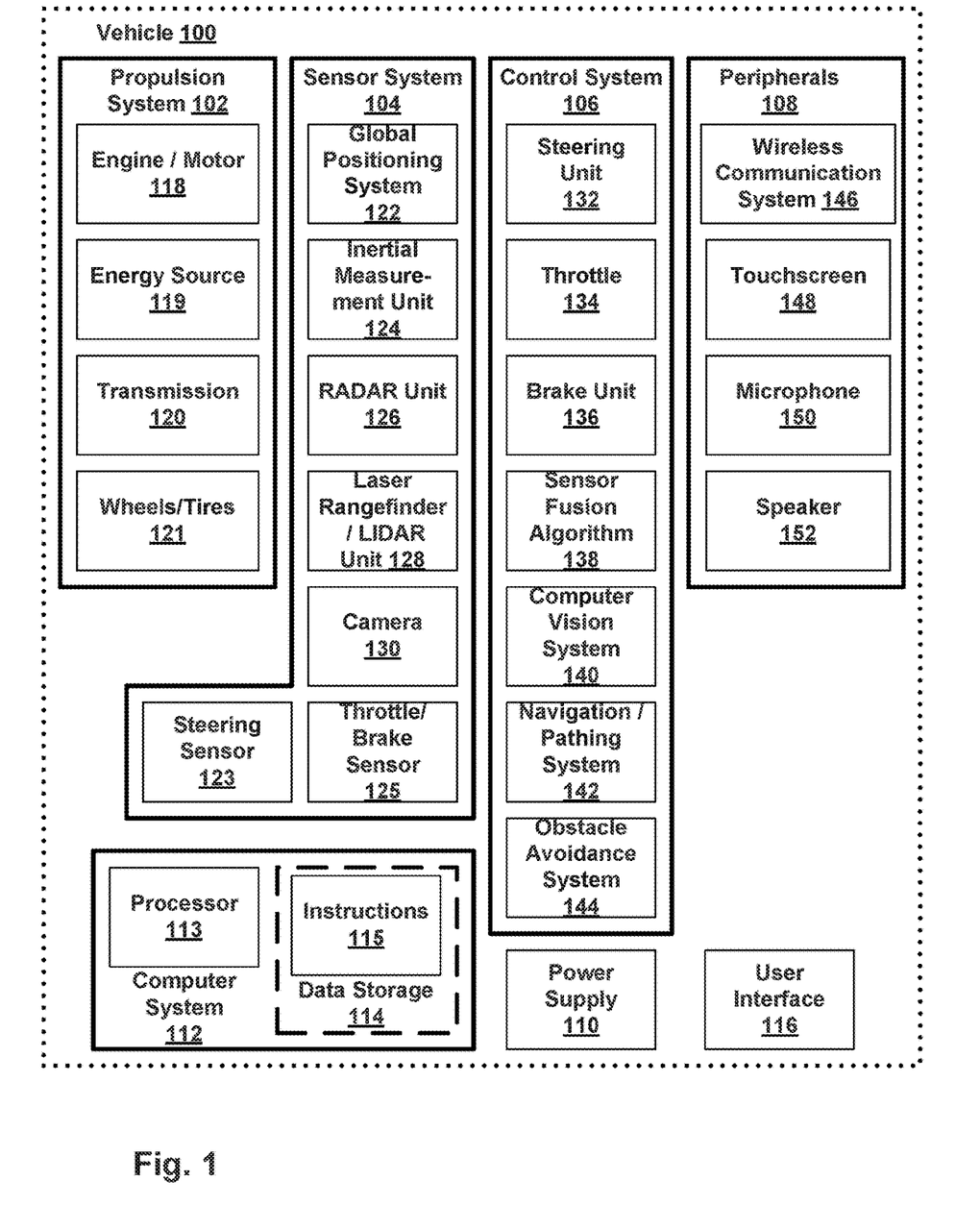
FIG. 1 is a functional block diagram illustrating a vehicle, according to an example embodiment.

FIG. 1 is a functional block diagram illustrating a vehicle 100, according to an example embodiment. The vehicle 100 could be configured to operate fully or partially in an autonomous mode. While in autonomous mode, the vehicle 100 may be configured to operate without human interaction. For example, a computer system could control the vehicle 100 while in the autonomous mode, and may be operable to operate the vehicle an autonomous mode. As part of operating in the autonomous mode, the vehicle may identify objects of the environment around the vehicle. In response, the computer system may alter the control of the autonomous vehicle.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., $O_2$ monitor, fuel gauge, engine oil temperature, brake wear).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental objects (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short-range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

In some embodiments, the computer system 112 may make a determination about various objects based on data that is provided by systems other than the radio system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
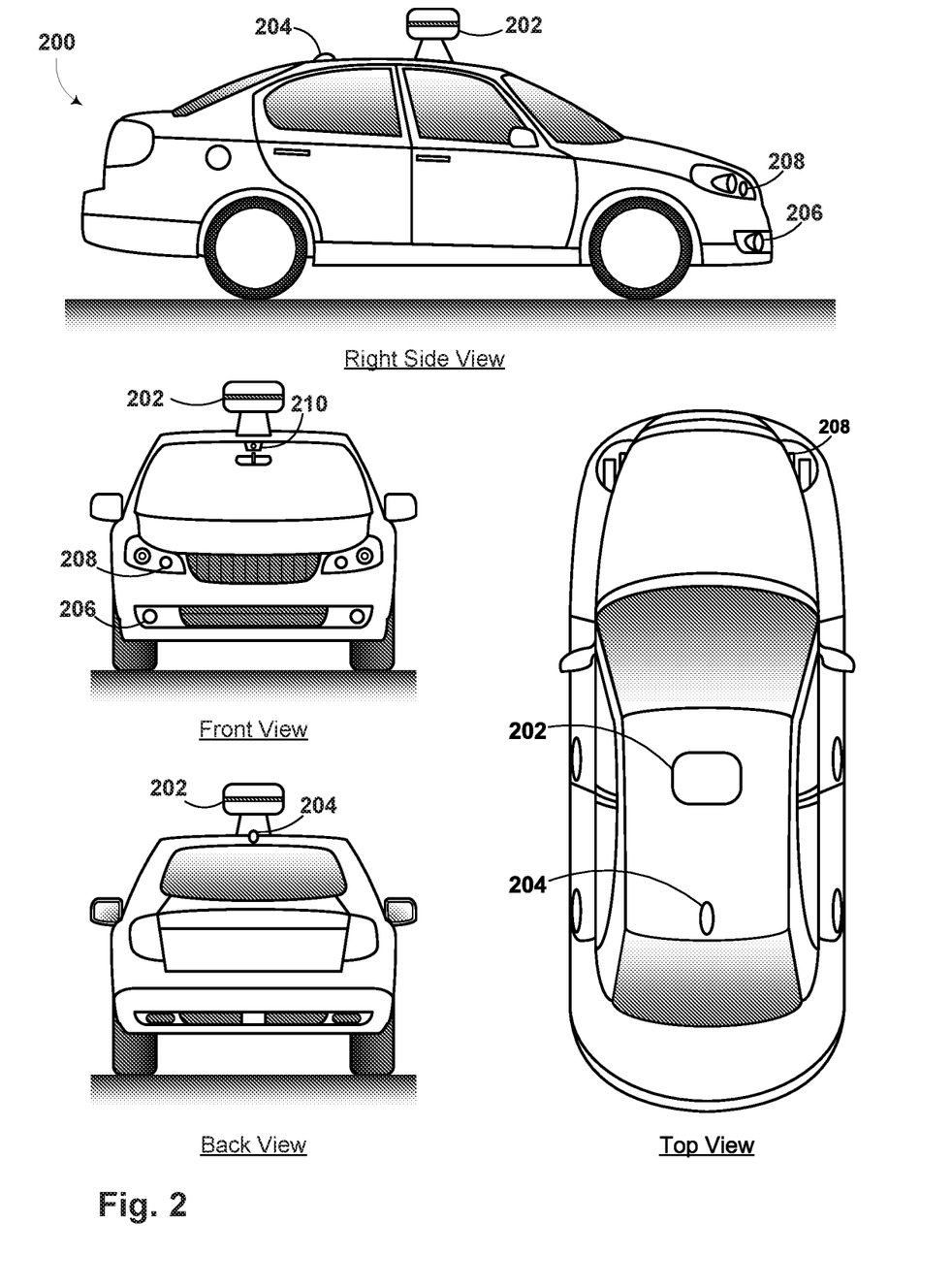
FIG. 2 shows a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radio unit 206, deflectors 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, radio devices (e.g., Bluetooth and/or 802.11), and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include the front location of radio unit 206. Additionally, the sensor unit may be used in conjunction with the deflectors 208. In one example, the sensor unit 202 may transmit a radar signal that is deflected in a different direction by at least one of the deflectors 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short-range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3A:
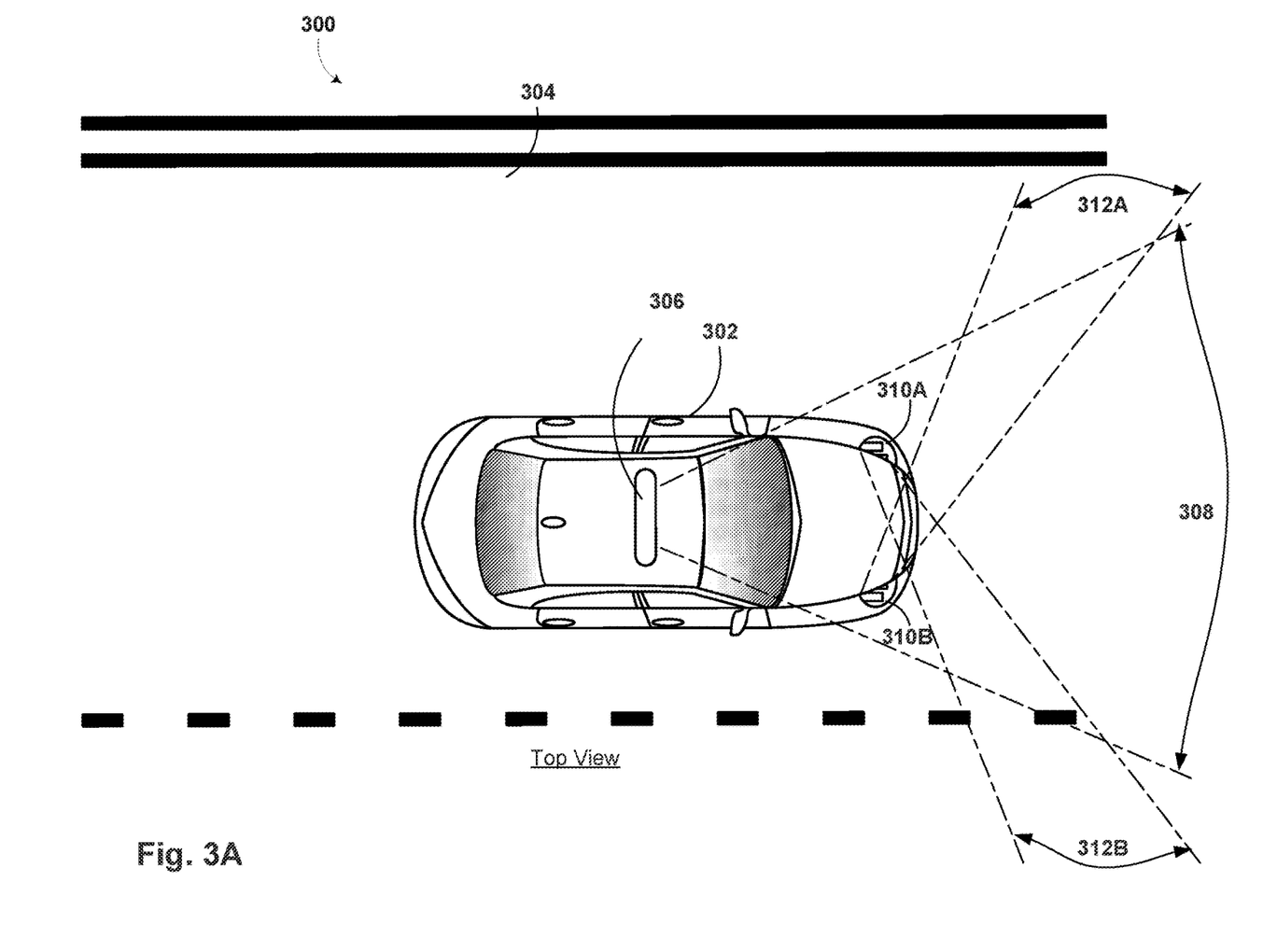
FIG. 3A illustrates a top view of an autonomous vehicle operating scenario, according to an example embodiment.
Figure 3B:
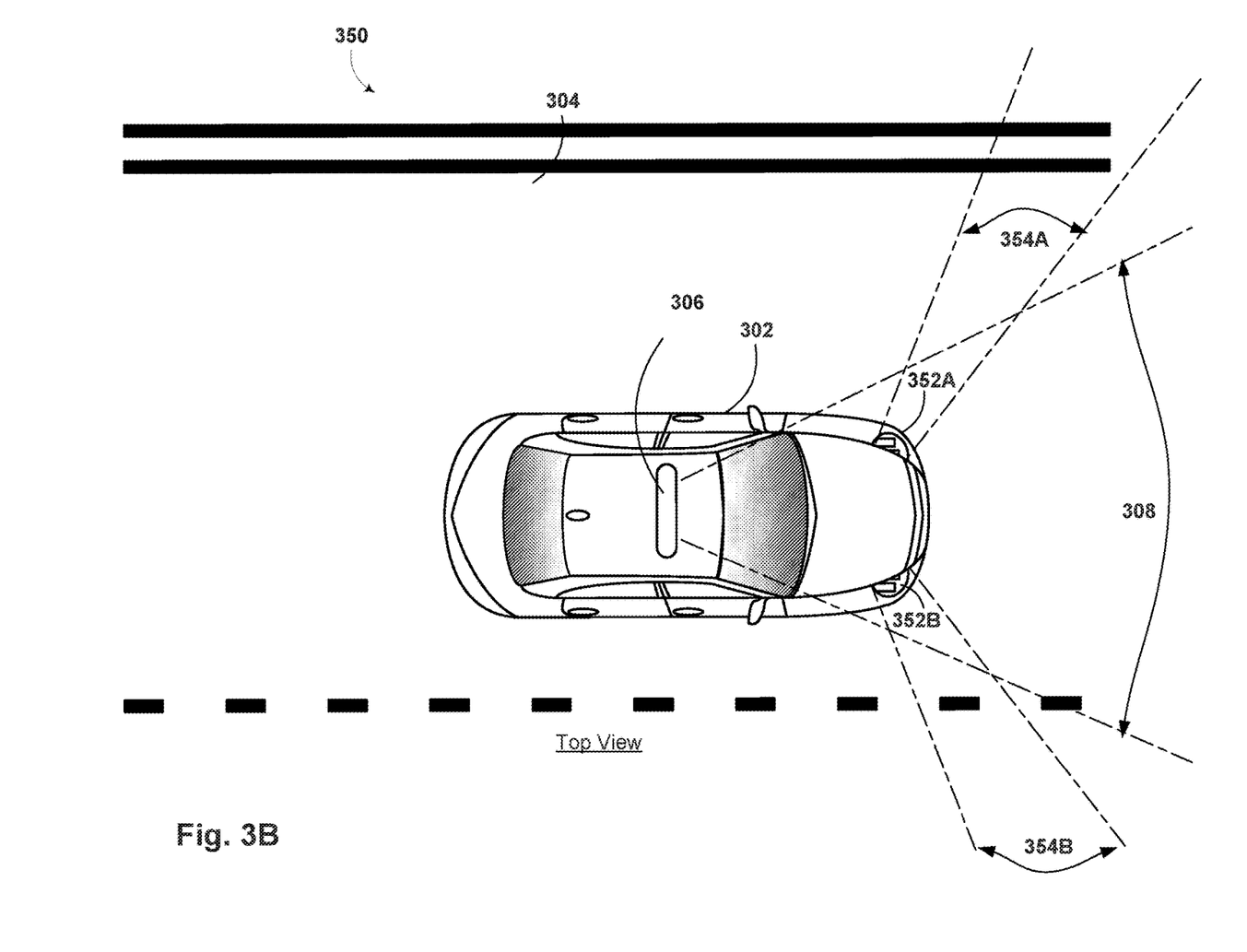
FIG. 3B illustrates a top view of an autonomous vehicle operating scenario, according to an example embodiment.

FIG. 3A illustrates a top view of a scenario encountered by an autonomous vehicle, in accordance with an example embodiment. As shown, an autonomous vehicle 302 may be operating in an autonomous mode within an environment 300 and traveling along roadway 304. As part of the autonomous operation, the autonomous vehicle 302 may transmit a radar signal by way of its radar unit 306. Similarly, FIG. 3B illustrates a top view of a scenario encountered by an autonomous vehicle, in accordance with an example embodiment. FIG. 3A depicts deflectors 310A and 310B configured as reflectors. FIG. 3B depicts the deflectors 352A and 252B as refractors. In some examples, the deflectors may be retractably mounted to the vehicle. Therefore, the vehicle may selectively operate with the deflectors enabled (i.e. operating to deflect radar signals) or disabled (i.e. not operating to deflect radar signals). In further examples, the deflectors may be mechanically or electronically steerable. The deflector may be able to steer the deflected beam across a region.

The example signal transmitted by the radar unit 306 has a beamwidth 308. The beam width 308 is a region over which the radar unit 306 transmits a signal. In some examples, the radar unit 306 may be configured to transmit radar signals in four different quadrants, one of which is shown as beam width 308. The quadrants may be front, back, left and right. In some examples, each quadrant may be approximately 90 degrees in width. In some other examples, the quadrants may be offset. For example, offset quadrants may be front left, front right, back left, and back right. The radar unit may be further configured to receive radar signals that are reflected back the autonomous vehicle 302 over the 360-degree azimuth plane. Thus, as the autonomous vehicle 302 may transmit radar signals and receive radar reflections in order to determine objects in the region around the autonomous vehicle 302.

In some examples, the deflectors may be configured to deflect the radar signal so that beamwidth of the deflected signal does not overlap with the beamwidth of the respective signal transmitted by the radar unit. By saying the two signals are non-overlapping, it means that each respective signal (i.e. the transmitted signal and the deflected signal) cover different portions of the azimuth plane. In some examples, such as FIG. 3A, the two signals may cross paths as one is deflected, and still have a non-overlapping beamwidth. In other examples, such as FIG. 3B, the two signals may not cross paths as one is deflected, and still have a non-overlapping beamwidth.

In some instances, it may be desirable for a radar unit 306 to interrogate portions of the environment 300 that are not directly within the line of sight of the radar unit 306. Thus, the autonomous vehicle 302 may include deflectors 310A and 310B. The radar signal transmitted by the radar unit 306 may the beamwidth 308 cover at least one of the deflectors 310A and 310B. When the radar signal hits the deflectors 310A and 310B it may be deflected in a direction across the vehicle, shown as beamwidths 312A and 312B. As shown in FIG. 3B, the radar signal may be deflected in the direction away from the vehicle, shown as beamwidths 354A and 354B.

The deflectors 310A and 310B may take different positions depending on various embodiments. Additionally, in some embodiments, there may be more or fewer deflectors. In some examples, the deflectors 310A and 310B may be metallic reflectors. However, in other examples the deflectors may be non-metallic. The metallic reflectors may be mounted to the vehicle, for example, near the headlights. In some examples, the metallic reflectors may be built into the structure of the vehicle. In other examples, the metallic reflectors may be removeably (or retractably or rotatably) mounted to the vehicle, such as to the hood or to the headlight area of the vehicle. The metallic reflectors may be attachable to the vehicle by magnets, suction cups, adhesives, or other means. In other examples, the deflectors may be mounted under the hood, within the headlights, or be integrated within the vehicle in other ways.

In some examples, the metal reflectors may be a flat surface. In other examples, the metal reflectors may be a convex or concave surface. The shape of the deflector may be designed to provide desired deflected beam characteristics. For example a deflected beam may be widened or narrowed based on the shape of the respective deflector. In some further examples, the shape and or the angle of the deflected beam may be adjusted during operation to scan and/or shape the deflected beam. In various examples, the deflectors may take the form of a shaped convex or concave parabolic offset reflector and/or comprise multiple reflectors, such as a cassegrain or gregorian reflector. In some examples, the deflectors may be passive devices that reflect or refract radar. In other examples, the deflectors may be active, similar to a repeater. An active deflector may be configured to receive a radar signal and re-transmit an amplified version of the radar signal.

In some other examples, the deflectors 352A and 352B may be non-metallic. Non-metallic deflectors may either reflect, refract, or in other ways steer the radar signals. In some examples, the deflectors may be made from a diffraction grating or a dielectric. The diffraction grating may be a printed pattern, a radar mirror, and/or a hologram deflector. A hologram deflector may include a hologramic pattern which causes a deflected rays according hologram regenerations in the millimeter wave regions. As shown in FIG. 3B, the deflectors 352A and 352B may cause the radar signals to be deflected in an outward manner. In some examples, the deflectors 352A and 352B may be mounted to or integrated within the headlight units. In another examples, the deflectors 352A and 352B may be a single deflector, such as a diffraction grating. The diffraction grating may be mounted on, under, or within, the hood of the car. The diffraction grating may be a structure that is printed or layered on the hood. In some examples, the diffraction grating may be a metallic or a dielectric material that is configured to reflect and/or refract the radar signals.

Figure 3C:
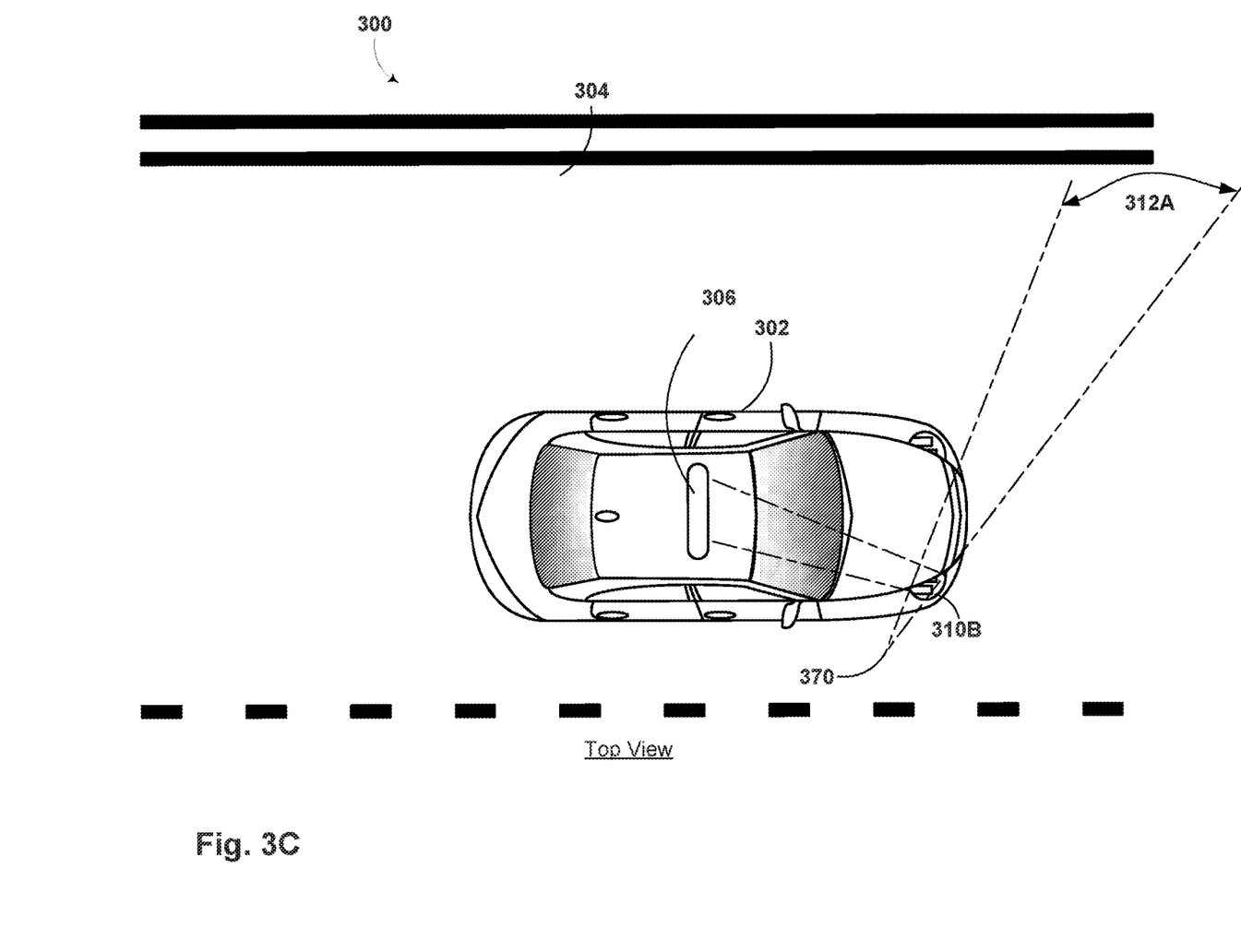
FIG. 3C illustrates a top view of an autonomous vehicle operating scenario, according to an example embodiment.

FIG. 3C illustrates a top view of an autonomous vehicle operating scenario, according to an example embodiment. As shown in FIG. 3C, the radar unit 306 may transmit a relatively narrow radar beam that is directed toward a deflector 310B. This narrow beam may be deflected as beamwidth 312A. In some other examples, the radar unit may transmit multiple narrow beams, with each beam being deflected by a respective deflector unit.

When a radar beam is deflected, it may appear to come from a virtual radar unit located at position 370. Thus, the radar beamwidth 312A may be considered a "virtual line of sight." The main beamwidth (i.e. direct beamwidth) of the radar unit 306 may be considered to be a "direct line of sight." By saying the direct beamwidth and the deflected beamwidth are non-overlapping, it means that the direct line of sight and the virtual line of sight are at different angles across the 360-degree azimuth plane.

Figure 4:
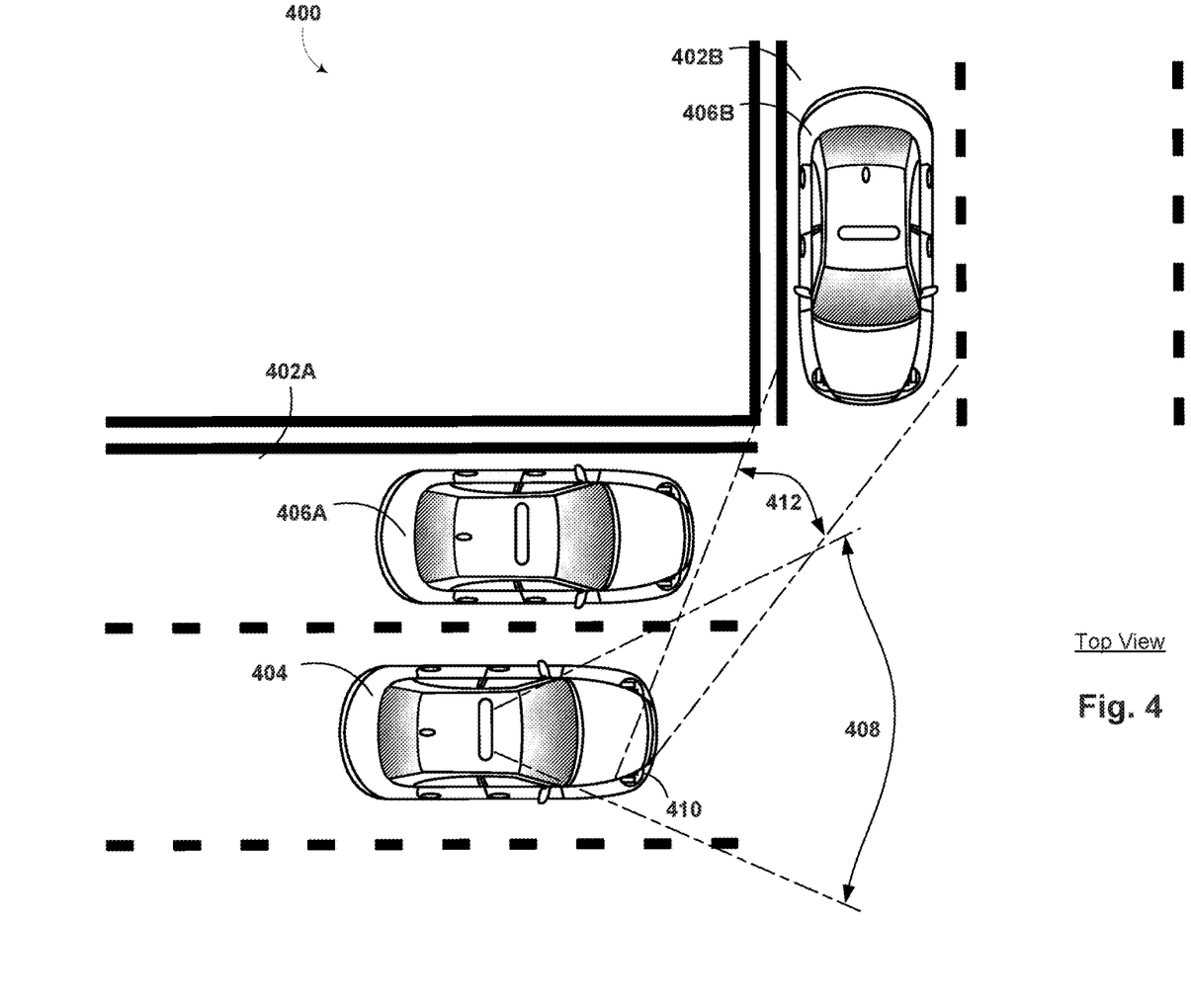
FIG. 4 illustrates a top view of an autonomous vehicle operating scenario, according to an example embodiment.

FIG. 4 illustrates a top view of an autonomous vehicle operating scenario 400, according to an example embodiment. Scenario 400 has a first roadway 402A intersecting with a second roadway 402B. A vehicle 404 is traveling along a lane of the first roadway 402A. A second vehicle 406A may be traveling in the same direction as vehicle 404 in a different lane of the first roadway 402A. A third vehicle 406B may be traveling in a lane of the second roadway 402B.

In one example, vehicle 404 may attempt to make a right turn on to the second roadway 402B. This right turn may be called a protected right turn as vehicle 406A is located directly to the left of the turning vehicle 404. While making a protected right turn, traditional radar system of vehicle 404 may be obscured from imaging the second roadway 402B. The vehicle 404 may include a radar unit and radar deflectors, such as those discussed with respect to FIGS. 3A and 3B. The radar unit may transmit a radar signal having beamwidth 408. The beamwidth of the transmitted radar signal may hit one or more of the deflectors, such as deflector 410. The deflector 410 may deflect a portion of the radar signal in another direction. For example, the deflector 410 may deflect a portion of the radar signal as beamwidth 412.

By deflecting the transmitted radar beam, vehicle 404 may be able to transmit a radar signal around the vehicle 406A in the adjacent lane. Therefore, the vehicle 404 may be able to transmit a radar signal that will reflect off the vehicle 406B traveling in the second roadway 402B. Thus, as vehicle attempts to make a protected right turn, it can image the lane into which it is turning by deflecting the radar signal transmitted from a radar unit mounted to the top of the vehicle into the lane.

Additionally, when the deflected radar signal hits vehicle 406B, the vehicle 406B may reflect at least a portion of the radar signal. Similar to when the radar signal is transmitted, a direct line of sight between vehicle 404 and vehicle 406B may not exist. Therefore, the reflected radar signal may not directly return to the radar unit of the vehicle 404. Consequently, the deflector unit 410 may deflect the radar signal that reflected off the vehicle 406B back to the radar unit on top of vehicle 404.

Figure 5:
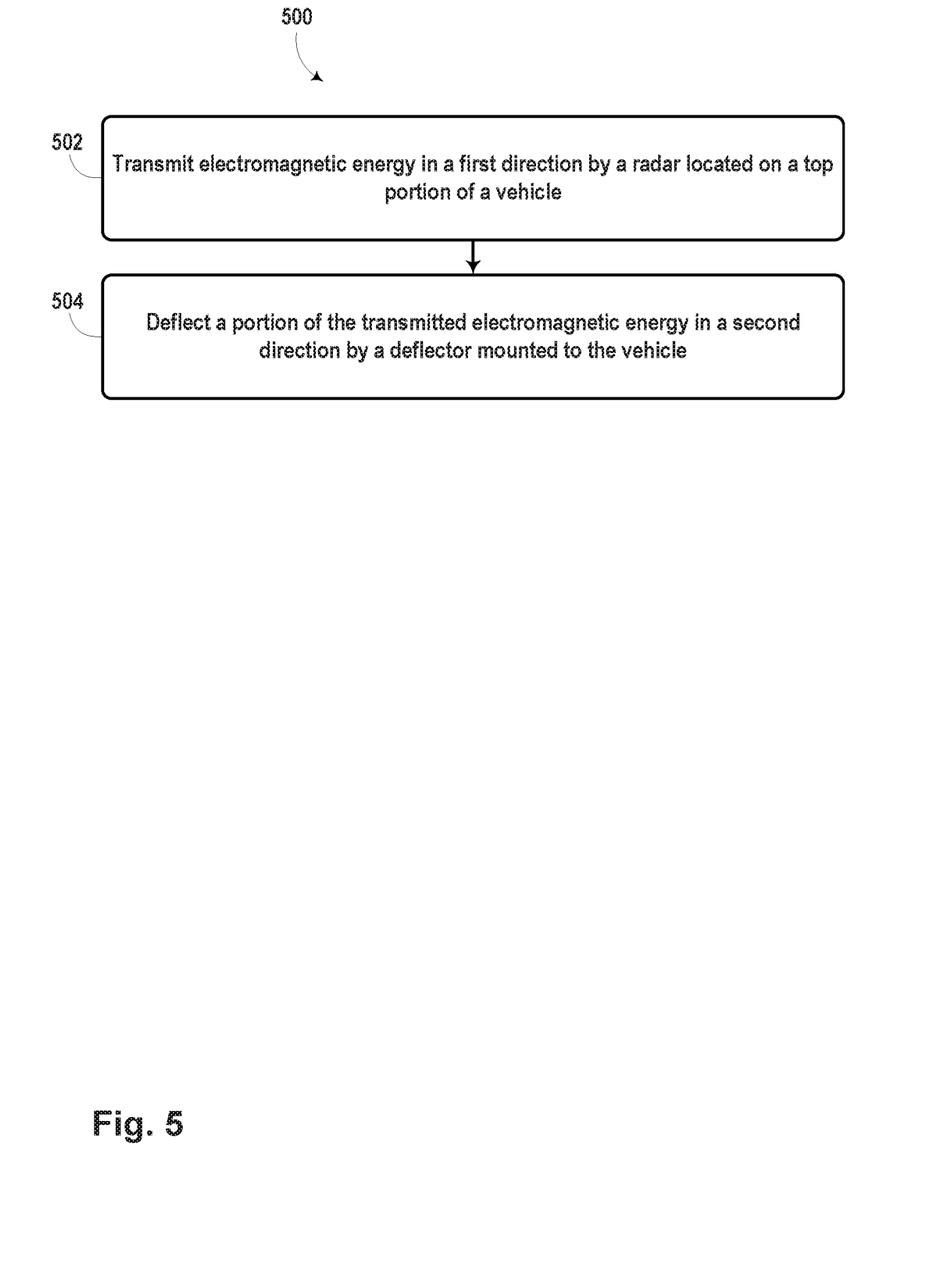
FIG. 5 shows a method, according to an example embodiment.

As shown in FIG. 5, a method 500 is provided for deflecting radar signals with vehicular radar deflecting units. The method could be performed using any of the apparatus shown in FIGS. 1-2, 3A, 3B, and 4 and described herein; however, other configurations could be used as well. FIG. 5 illustrates the blocks in an example method. However, it is understood that in other embodiments, the blocks may appear in different order and blocks could be added, subtracted, or modified. Additionally, the blocks may be performed in a linear manner (as shown) or may be performed in a parallel manner (not shown).

Block 502 includes the vehicle transmitting electromagnetic energy in a first direction by a radar unit located on a top portion of a vehicle. As previously discussed the radar unit may have multiple different radar beams, each pointed in a different direction. In other examples, the radar unit may have a single beam. Each radar beam may have a respective beam width. In some examples, the 360-degree azimuth plane may be divided into various quadrants, each having a respective radar beam being transmitted across the quadrant. In some examples, there may be four quadrants, each being 90 degrees wide. In other examples, there may be more or fewer quadrants (or sectors), and the width of the various quadrants may be different as well. In some examples, such as that shown with respect to FIG. 3C, a narrow beam may be transmitted by the main radar unit in the direction of the radar deflector.

Block 504 includes deflecting a portion of the transmitted electromagnetic energy in a second direction by a deflector mounted to the vehicle. As discussed with respect to FIGS. 3A, 3B, and 4, the vehicle may include at least one deflector.

The deflector may be mounted to or integrated within a portion of the vehicle. In some examples, the at least one deflector may be located near the front of the vehicle, such as near the headlights. The deflector may be configured to deflect at least a portion of the transmitted radar signal in a different direction than it was originally transmitted. For example, the deflected radar signal may be deflected in a second direction is a direction substantially aligned with a lane of a roadway intersecting a roadway on which the vehicle is traveling. Thus, the deflected radar signal may be able to reflect off another vehicle that is traveling on an intersecting a roadway to which the vehicle transmitting the radar signal is traveling. By deflecting the radar signal, the vehicle may be able to image a lane around another vehicle when it is making a protected right turn.

In some additional examples, the deflector may also be configured to deflect radar reflections back to the radar unit. When the deflected radar signal hits a vehicle, at least a portion of the radar signal will be reflected back to the deflector from which it came. The deflector can then deflect the radar signal back to the radar unit for processing. When the radar unit received the deflected reflection signal, it may be able to determine if a vehicle is traveling in the lane in which the vehicle transmitting the radar signal intends to turn.

Based on the processing performed by a processor of the vehicle with the radar unit, the control of the vehicle with the radar unit may be adjusted. For example, vehicle with the radar unit may be operating in an autonomous mode. Based on deflecting the radar signal, the vehicle may determine whether or not it is safe to make a protected right turn. Based on the determination, the vehicle may either execute the right turn, wait to execute the right turn, or the vehicle may return to a human-controlled mode.

Figure 6:
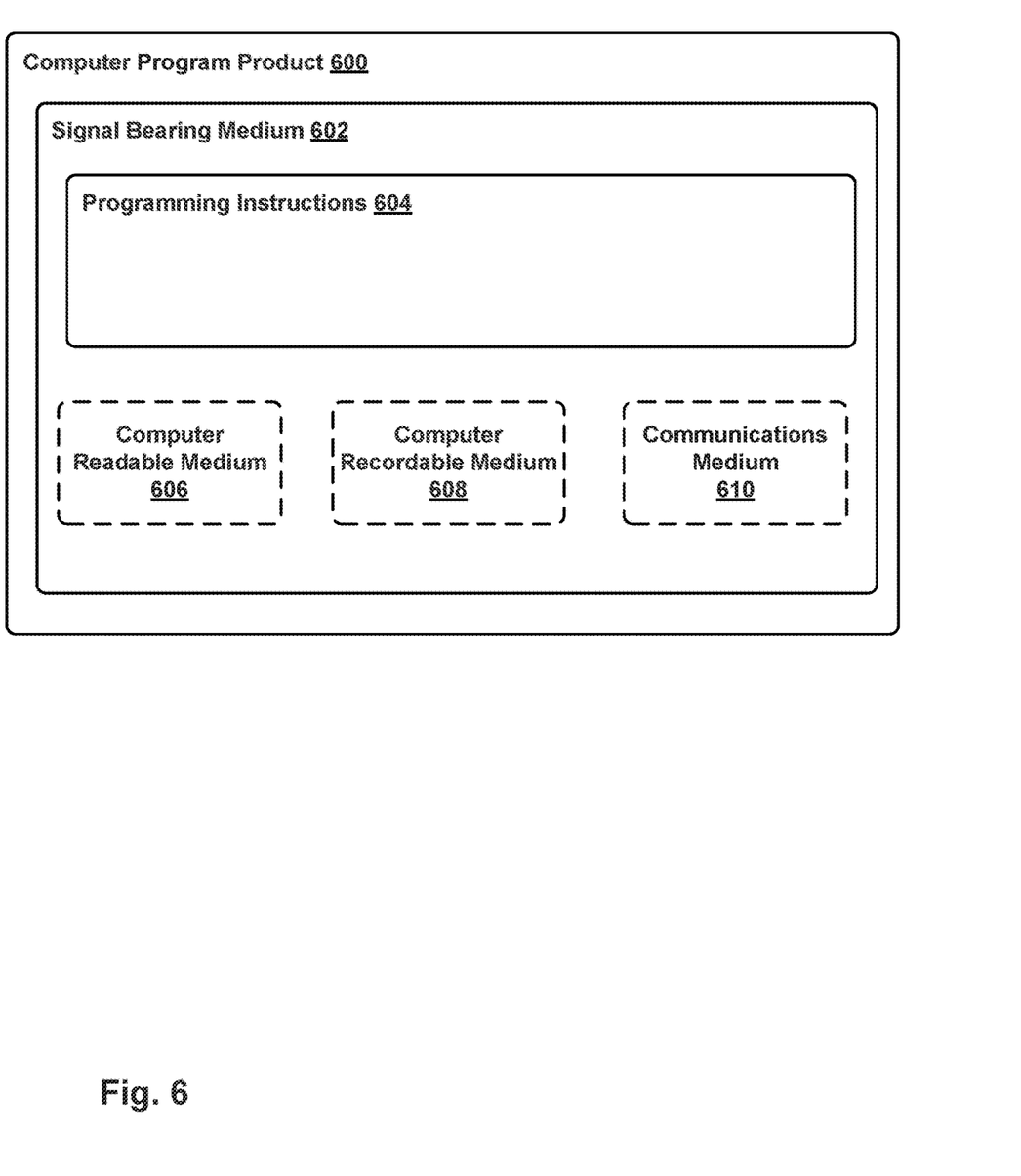
FIG. 6 is a schematic diagram of a computer program, according to an example embodiment.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 may encompass a non-transitory computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the computer system 112 of FIG. 1 may be configured to provide various operations, functions, or actions in response to the programming instructions 604 conveyed to the computer system 112 by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   deflecting a portion of reflected electromagnetic energy received from a first direction by a deflector mounted to a vehicle, wherein the first direction is substantially aligned with a lane of a roadway intersecting a roadway on which the vehicle is traveling; and
   receiving the deflected electromagnetic energy in a second direction by a radar located on a top portion of the vehicle.

2. The method of claim 1, wherein the deflector is a metallic reflector.

3. The method of claim 2, wherein the metallic reflector causes the first direction to be in a direction directed toward the opposite side of the vehicle compared to the second direction.

4. The method of claim 1, wherein the deflector is at least one of a diffraction grating and a dielectric.

5. The method of claim 4, wherein the dielectric causes the first direction to be in a direction directed toward the same side of the vehicle compared to the second direction.

6. The method of claim 1, wherein the deflector is an active deflector.

7. The method of claim 1, wherein the first direction is selected based on a given direction that the vehicle is turning.

8. A vehicle system comprising:
   a radar deflector unit mounted on a vehicle and near a front of the vehicle, wherein the radar deflector unit is configured to deflect a portion of a reflected radar signal over a first beamwidth; and
   a radar reception unit located on a top portion of the vehicle configured to receive the deflected reflected radar signal having a second beamwidth, wherein the first beamwidth and the second beamwidth are non-overlapping.

9. The system of claim 8, wherein the deflector is a metallic reflector.

10. The system of claim 9, wherein the metallic reflector causes a direction of the deflection to be directed toward the opposite side of the vehicle compared to a direction of the radar reception.

11. The system of claim 9, wherein the metallic reflector is located on a top surface of a headlight of the vehicle.

12. The system of claim 8, wherein the deflector is located within a headlight housing.

13. The system of claim 8, wherein the deflector is at least one of a diffraction grating and a dielectric.

14. The system of claim 13, wherein the dielectric causes a direction of the deflection to be directed toward the same side of the vehicle compared to a direction of the radar reception.

15. The system of claim 8, wherein the deflector is an active deflector.

16. The system of claim 8, wherein a direction of the deflection is selected based on a given direction that the vehicle is turning.

17. A method comprising:
    deflecting a portion of reflected electromagnetic energy with a first beamwidth in a first direction aligned with a driver side of a vehicle by a deflector mounted to the vehicle; and
    receiving electromagnetic energy with a second beamwidth by a radar located on a top portion of the vehicle, wherein the electromagnetic energy is received at least in part in a second direction of the deflector mounted proximate to a passenger side of the vehicle, wherein the first beamwidth and the second beamwidth are non-overlapping.

18. The method of claim 17, wherein the deflector is a metallic reflector.

19. The method of claim 17, wherein the deflector is an active deflector.

20. The method of claim 17, wherein the first direction is selected based on a given direction that the vehicle is turning.

\* \* \* \* \*